(12) United States Patent
Cetin et al.

(10) Patent No.: US 9,396,399 B1
(45) Date of Patent: Jul. 19, 2016

(54) UNUSUAL EVENT DETECTION IN WIDE-ANGLE VIDEO (BASED ON MOVING OBJECT TRAJECTORIES)

(71) Applicant: Grandeye, Ltd., Guildford, Surrey (GB)

(72) Inventors: A Enis Cetin, Ankara (TR); Timucin Noyan, Ankara (TR); Mark K Davey, Bromley (GB)

(73) Assignee: Grandeye, Ltd., Guildford (GB)

( * ) Notice: Subject to any disclaimer, the term of this patent is extended or adjusted under 35 U.S.C. 154(b) by 0 days.

(21) Appl. No.: 14/482,342

(22) Filed: Sep. 10, 2014

Related U.S. Application Data

(63) Continuation of application No. 13/647,492, filed on Oct. 9, 2012, now Pat. No. 8,866,910, which is a continuation of application No. 12/562,715, filed on Sep. 18, 2009, now Pat. No. 8,284,258.

(60) Provisional application No. 61/097,915, filed on Sep. 18, 2008.

(51) Int. Cl.
| | |
|---|---|
| *G06K 9/00* | (2006.01) |
| *H04N 5/225* | (2006.01) |
| *G06K 9/32* | (2006.01) |
| *H04N 7/18* | (2006.01) |

(52) U.S. Cl.
CPC .......... *G06K 9/00771* (2013.01); *G06K 9/3241* (2013.01); *G06K 9/00765* (2013.01); *H04N 7/183* (2013.01)

(58) Field of Classification Search
CPC .... G06K 9/3241; G06K 9/00771; H04N 7/183
USPC .................................. 382/103, 107; 348/169
See application file for complete search history.

(56) References Cited

U.S. PATENT DOCUMENTS

| | | | | |
|---|---|---|---|---|
| 7,263,472 B2 * | 8/2007 | Porikli | ............... | G06K 9/00335 382/103 |
| 7,426,301 B2 * | 9/2008 | Porikli | ............... | G06K 9/00335 382/181 |
| 8,285,060 B2 * | 10/2012 | Cobb | ................. | G06K 9/00335 352/52 |

\* cited by examiner

*Primary Examiner* — Kanjibhai Patel
(74) *Attorney, Agent, or Firm* — Groover & Associates PLLC; Robert Groover; Gwendolyn Groover (57) ABSTRACT

Object images captured by a wide-angle camera are distorted due to the optical effects of the wide-angle lens. The disclosed innovations allow an automatic analysis on the corrected image distinguishing normal movement from an unusual event movement. The analysis is based on Markov Modeling on moving object trajectories and motion angles.

12 Claims, 5 Drawing Sheets

UNUSUAL EVENT DETECTION IN WIDE-ANGLE VIDEO (BASED ON MOVING OBJECT TRAJECTORIES)

CROSS REFERENCE TO RELATED APPLICATIONS

This application claims priority from provisional patent application 61/097,915, filed on Sep. 18, 2008, which is hereby incorporated by reference.

BACKGROUND

The present inventions relate generally to image processing in a wide-angle video camera, and more specifically to tracking moving regions and detecting unusual motion activity within the field of view of the camera.

Note that the points discussed below may reflect the hindsight gained from the disclosed inventions, and are not necessarily admitted to be prior art.

Video surveillance systems using wide-angle optical systems apply image data processing to enhance or obscure visual information as necessary using program algorithms. It is useful to be able to define the extents within which image processing operations should take place; for example moving region detection and object tracking software may define the bounding box of a suspicious object and use it to direct enhancement processing to the appropriate area of the image. Regions of interest (ROIs) can be identified in the image based on motion, color, behavior, or object identification. Computer algorithms and programs can be implemented at the camera or at a monitoring base station to automate selection of the ROIs, motion tracking, sound an alarm, summon emergency responders, activate responsive systems (e.g., close doors, seal bulkhead, lock doors, activate ventilation or fire-suppression system, activate lighting, etc.), or other actions as programmed into the system. Further, the object tracking, or alarm, or other processing can be performed on the corrected or on uncorrected versions of the images or video.

In many surveillance systems, standard pan-tilt-zoom (PTZ) cameras capture images of an area. A PTZ camera relies on mechanical gears to adjust the pan, tilt, and zoom of the camera. These cameras have various disadvantages or limitations in surveillance system and applications. Typically, adjusting to concentrate on a region of interest (ROI) necessarily requires a PTZ camera to adjust its view to the ROI and lose sight of the overall area. PTZ cameras are also prone to mechanical failure, misalignment during maintenance, and are relatively heavy and expensive.

In more recent surveillance systems, a new class of cameras replaces the mechanical PTZ mechanisms with a wide-angle optical system and image processing circuitry and software. This type of camera monitors a wide-angle field of view and selects ROIs from the view to transmit to a base station; in this way it emulates the behavior of a mechanical PTZ camera. The wide-angle view can be as much as 180° and capture a full hemisphere of visual data. The wide-angle optics (such as a fisheye lens) introduce distortion into the captured image and processing algorithms are used to correct the distortion and convert it to a view that has a similar view and function as a mechanical PTZ camera. The movements and zoom function are emulated by image data processing accomplished by internal circuitry.

However, these innovations can be used in a camera with a view angle considerably less than 180°. The inventions can be used with annular lenses that often provide imagery that is not from 0 to 90 degree in the tilt (phi in spherical coordinates), but perhaps 40 to 130 degrees. Another lens type can use an ovalized rectangle shape. References to wide-angle cameras include lens systems that meet these criteria.

The captured 3D world space hemispherical image from a wide-angle camera appears distorted, and it can comprise what is sometimes referred to as a fisheye view. Image processing algorithms can correct this view to a more conventional 2D depiction on a monitor and also emulate the movement of a PTZ camera. The wide-view camera can simultaneously focus on multiple ROIs while still able to monitor the area within its entire field of view. This type of camera may be used to improve the processing of selected ROIs, because a wide field is always captured by the camera, and there is no need for mechanical movement and adjustment of the camera's lens system.

The image processing is typically performed on digital image data. The captured image data is converted into a digital format for image data processing at the camera. The processed data can than be transmitted to a base station for viewing. The image data can be converted to an analog signal for transmission to the base station, or the image data can be left in the processed digital format. Additionally, the input signal to the base station, either analog or digital, can be further processed by the base station. Again, image processing and ROI selection at the camera can be fully automatic or subject to various control inputs or overrides that effect automatic image processing. Manual, automatic, or a combination of control options utilizing the combination of the base station and internal camera circuitry can be implemented.

Wide-angle surveillance is necessarily implemented in many CCTV applications. Cameras such as dome cameras and cameras with fisheye or peripheral lenses can produce wide-angle video. A major weakness of wide-angle surveillance cameras and systems is that they do not have the capability to produce automatic alarms to unusual events due to moving objects within the viewing range of the camera.

SUMMARY

The present application discloses new approaches to correcting the optical distortion to an image of a rectangular object to reconstruct the object for both camera position distortion and distortion effects introduced by the optical system.

In some embodiments, the inventions disclose methods and systems that interpret the trajectories of moving objects and people in a wide angle video. Moving objects in wide angle video are determined, resulting in blobs of pixel locations corresponding to moving objects. Each blob is tracked over time and trajectories consisting of coordinates of blobs are determined. The trajectories are transformed into a corrected image domain, and then each trajectory is fed to a set of Markov Models (MM), which are trained with prior trajectory data corresponding to regular and unusual motion trajectories of moving objects. Markov Models trained using regular motion produce higher probability values for regular moving objects compared to MMs trained using unusual event trajectories. Whenever there is an unusual motion in wide angle video, the MM corresponding to unusual events will produce the highest probability.

The disclosed innovations, in various embodiments, provide one or more of at least the following advantages. However, not all of these advantages result from every one of the innovations disclosed, and this list of advantages does not limit the various claimed inventions.

Cheaper.

Can be implemented at the camera.

Can implement with software upgrade.

Uses existing wide-angle camera infrastructure.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF SAMPLE EMBODIMENTS

The numerous innovative teachings of the present application will be described with particular reference to the presently preferred embodiment (by way of example, and not of limitation).

Figure 1:
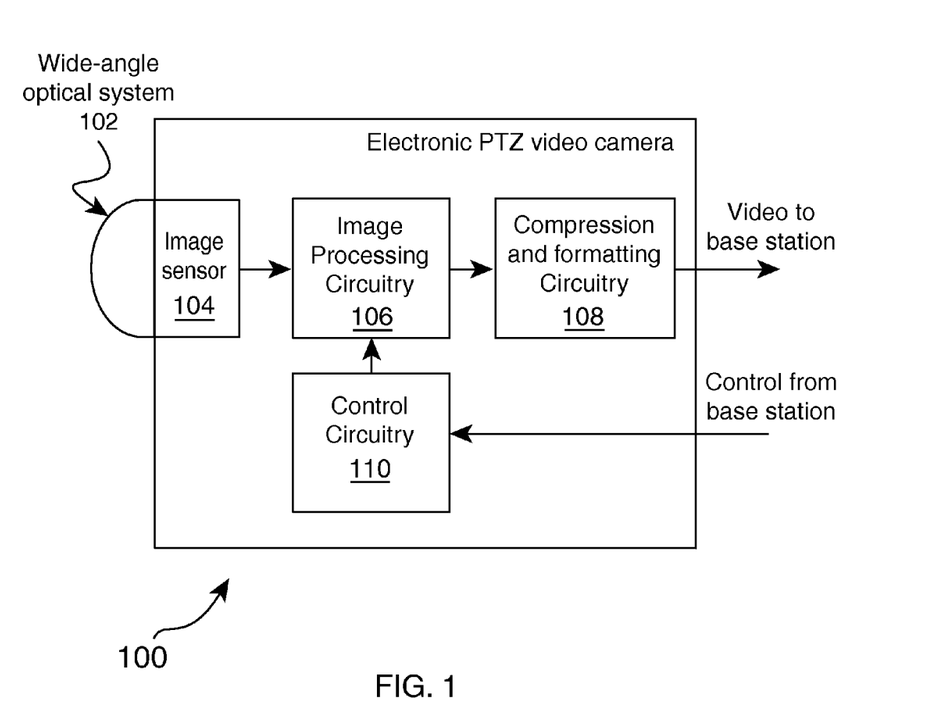
FIG. 1 schematically shows an example of an electronic PTZ wide-angle video camera.

FIG. 1 shows one example implementation of a preferred embodiment of an electronic PTZ camera, this example being described in terms of a video camera 100. The camera 100 includes an optical system 102 that communicates with image sensor 104. In some embodiments, the optical system 102 is a wide angle, anamorphic, annular, or panoramic lens system (for example), possibly including multiple lenses, holographic elements, or other elements. The lens is typically configured to cover an approximate 180° field. Sensor 104 passes a captured image to image processing circuitry 106 for processing, such as correction of any distortions of the image caused by the optical system 102 (though other processing is also possible). Examples of image processing that might be performed include geometric transformations (zoom-in, zoom-out, rotate, etc.), color correction, brightness and contrast adjustment, shading, compositing, interpolation, demosaicing, image editing, or segmenting. PTZ emulating image processing occurs in the image processing circuitry 106. Other processes performed on the image data are possible. In some embodiments, the optical system distortion is corrected though the use of tables of correction values that define the necessary warping, such as that caused by the lens system or other known factors.

The corrected image is preferably compressed and formatted by circuitry 108 before being output, such as to a base station (not shown) for monitoring. The camera 100 is preferably controlled by the base station through control circuitry 110. It is noted that other architectures and camera arrangements can implement the present innovations, and the example of FIG. 1 is only illustrative and not limiting.

The control circuitry 110 is used to control aspects of operation of the image processing circuitry 106. Various control options can be implemented for circuitry 110 and 106. Operation can be configured for automatic control selecting ROIs based on operating algorithms such as face recognition, motion detecting, event detection, or other implemented parameters. PTZ control can operate to focus on one or more ROI simultaneously while maintaining surveillance throughout the field of view. Control from a base station can be automatic or manual, with the ability to manually select ROIs, adjust image quality parameters, or otherwise adjust and manipulate the image or PTZ view. Control can essentially be automatic within the camera with manual adjustments or overrides performed by the base station. This flexibility to control and vary the captured views by data processing can be thought of as implementing one or more virtual cameras, each able to be independently controlled, by processing captured image data from the single optical system, or even a combination of several optical systems, and emulate one or more PTZ cameras.

Various optical distortion effects can be introduced by the optical system 102, i.e. lens configuration that the image processing circuitry 106 can compensate. For example, in geometric optics and cathode ray tube (CRT) displays, distortion is a deviation from rectilinear projection, that is, a projection in which straight lines in a scene fail to remain straight in an image. This is a form of optical aberration. Although distortion can be irregular or follow many patterns, the most commonly encountered distortions are radially symmetric, or approximately so, arising from the symmetry of a photographic lens.

Radial distortion can usually be classified as one of two main types: 1) barrel distortion and 2) pincushion distortion. In "barrel distortion", image magnification decreases with distance from the optical axis. The apparent effect is that of an image which has been mapped around a sphere. Fisheye and similar lenses, which take hemispherical views, utilize this type of distortion as a way to map an infinitely wide object plane into a finite image area. In "pincushion distortion", image magnification increases with the distance from the optical axis. The visible effect is that lines that do not go through the centre of the image are bowed inwards, towards the centre of the image.

Radial distortion is a failure of a lens to be rectilinear: a failure to image lines into lines. If a photograph is not taken straight-on then, even with a perfect rectilinear lens, rectangles will appear as trapezoids: lines are imaged as lines, but the angles between them are not preserved (tilt is not a conformal map). This effect can be controlled by using a perspective control lens, or corrected in post-processing, such as image data processing.

Due to perspective, cameras image a cube as a square frustum (a truncated pyramid, with trapezoidal sides)—the far end is smaller than the near end. This creates perspective, and the rate at which this scaling happens (how quickly more distant objects shrink) creates a sense of a scene being deep or shallow. This cannot be changed or corrected by a simple transform of the resulting image, because it requires 3D information, namely the depth of objects in the scene. This effect is known as perspective distortion. This radial distortion can be corrected by algorithms operating in the camera.

The described embodiments include the capability to select a region of a captured image (such as one or more frames of video), whether processed or not, and to perform other data processing on that region. In one example implementation, the innovative camera captures an image, such as wide angle video (but not limited thereto), and corrects the wide angle view to create a corrected view (i.e., not distorted or less distorted view) that is sent to an operator. The operator (or specially designed software) can then define or designate a ROI for observation. In other embodiments, some processing is performed at different steps, such as object tracking, behavior analysis, motion detection, object recognition, or face recognition (for examples). These and other examples are described more fully below.

Recent advances in wide angle camera technology [e.g., US Patent Pub. 2007/0124783, U.S. Pat. No. 7,366,359, U.S. patent application Ser. No. 11/184,720, U.S. Pat. No. 5,684,937] and algorithmic developments in object tracking [U.S. Pat. No. 6,590,999, U.S. Pat. No. 6,394,557, public domain document C. Wren, A. Azarbayejani, T. Darrell, and Alex Pentland, "Pfinder: Real-time tracking of the human body," IEEE Transactions on Pattern Analysis and Machine Intelligence, 19(7):780785, 1997] make it feasible to extract a complete trajectory of an object from the wide angle video in a room or in a monitored scene. It is then possible to interpret the intention of the moving object based on this trajectory. In this application, a method and a system will be described for detecting unusual activity based on moving object trajectories.

The first step of most computer vision movement tracking algorithms is the segmentation of foreground objects from the background. In these approaches, foreground objects are moving objects. Moving objects in wide angle video can be determined by the background subtraction method. There are several background estimation methods listed in the literature [e.g., U.S. patent application Ser. No. 11/203,807; Stauffer, C, Grimson, "Adaptive background mixture models for realtime tracking," In: Proc. IEEE Computer Society Conf. on Computer Vision and Pattern Recognition, Vol. 2, pp. 246-252, 1999; and R. Collins, A. Lipton and T. Kanade, "A System for Video Surveillance and Monitoring," in Proc. American Nuclear Society (ANS) Eighth International Topical Meeting on Robotics and Remote Systems, Pittsburgh, Pa., Apr. 25-29, 1999]. In these prior art systems, a so-called background image is obtained from the video by either recursively averaging the past images of the video or by median filtering.

Since a moving object temporarily enters and leaves the image, the contribution of moving object pixels are immaterial compared to pixels corresponding to background objects when the video image frames are averaged over long time intervals, or the median value of a given pixel is probably due to the background of the scene, because most of the pixel values captured by the sensor should be due to static background objects. The estimated background image is subtracted from the current image of the wide angle video to determine moving pixels. As a result of this operation, blobs of remaining pixels in the image correspond to moving objects.

The system can also have a computer program comprising a machine-readable medium having computer executable program instructions thereon for executing the moving object detection and object tracking algorithms fully in the programmable camera device, such as described in U.S. patent application Ser. No. 10/924,279, entitled "Tracking Moving Objects in Video Using Wavelet Domain Information," by A. E. Cetin and Y. Ahiska, which is hereby incorporated by reference.

The moving blob of pixels in the i-th image frame of the wide angle video is associated with the corresponding blob in the i+1-st image frame of the wide angle video using an object tracking method (e.g., as described in patent application Ser. No. 10/924,279 in which the mean-shift tracking method used is based on the wavelet transform coefficients of the moving blob of pixels). The various options available can include analysis tracking motion or movement. In one embodiment, a plurality of video frames is compressed using a wavelet transform (WT) based coder, and the trajectory of moving objects is determined based on the histogram of the wavelet coefficients of the moving objects. This tracking is preferably carried out by mean-shift analysis of the histogram formed from the wavelet domain data of video frames. Another option compresses the video using a WT based coder without completely reconstructing the original video data to obtain wavelet data. Movement detection can operate on actual or compressed video data. Because wavelet coefficients carry both space and frequency information about an object, a histogram constructed from wavelet transform coefficients also contains structure information. The use of wavelet domain color information leads to a robust moving object tracking system. Other object tracking methods listed in the literature can be also used for tracking moving objects in wide angle video.

For example, let the center of mass of the blob of moving object pixels be $x_i$ at a given time instant. When the next image frame of the video arrives, this image is also subtracted from the background image and a new blob of moving object pixels is estimated. The center of mass the new blob $x_1$ will be different from the vector $x_i$ because the blob is due to a moving object. In this way, a sequence of vectors $x_i, x_2, \ldots, x_N$ representing the trajectory of the moving object is determined from the video.

The trajectory of an object in a straight path will be different in a wide angle camera compared to a narrow angle camera. In a narrow angle camera, the trajectory will be almost linear or the difference vectors will be almost the same for an object with a constant speed. In a wide angle camera on the hand, the trajectory will be curved and uneven because of the distorted nature of the image in a wide angle camera. Therefore, the trajectory interpretation methods [see e.g., Fatih Porikli, "Trajectory distance metric using hidden markov model based representation," *IEEE European Conference on Computer Vision*, PETS Workshop, 2004] developed for narrow angle cameras cannot be applied to wide angle cameras.

The disclosed embodiments herein describe an innovative event detection method for wide angle video. In this approach, the trajectory of a moving object is corrected and the corrected trajectory fed to a bank of Markov Models (MM) with well-defined states for interpretation. Markov models with designer-defined states have not been used in video data processing. Hidden Markov Models are the most widely used recognition engines for voice recognition, they are also recently used in image data processing, but in HMMs the states are determined according to an algorithm described in Lawrence Rabiner, Biing-Hwang Juang, *Fundamentals of Speech Recognition*, February 1993, Prentice Hall-NY. This increases computational cost significantly compared to Markov models with user defined states, because there is no need to estimate the hidden states. We do not use "hidden" states in Markov models in this process leading to computationally more efficient implementations, because there is no need to compute the probabilities due to hidden states in Hidden Markov Models (HMM). By defining the states of Markov models manually, we avoid the state estimation step of HMM algorithms. In speech processing it is not possible to define the states manually, however, we define states of Markov models according to the motion vector angles of moving objects in this approach.

Figure 2:
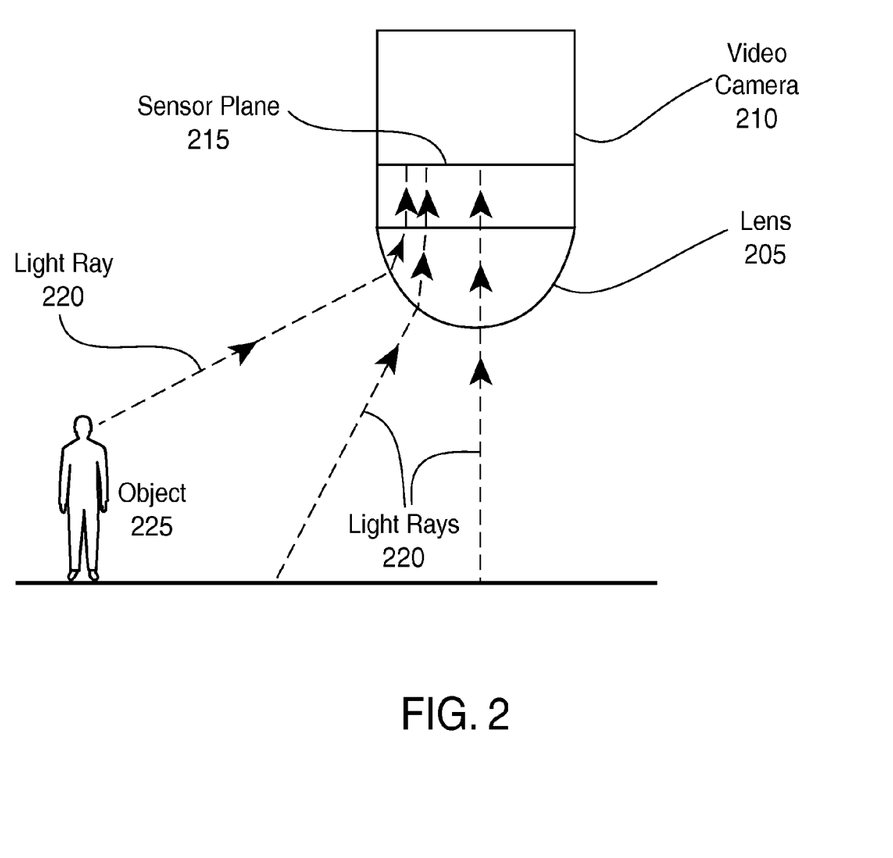
FIG. 2 schematically shows a cross-sectional view of a video camera with a fisheye lens compatible with the invention.

FIG. 2 schematically shows a cross-sectional view of a video camera with a fisheye lens compatible with the invention. When a conventional fisheye lens 205 with a 180° field of view is installed into a video camera 210, image frames of the video produced by the camera are distorted (see FIG. 4). A sensor plane 215 receives light rays 220 entering through the lens 205. The human FIG. 225 and other objects captured by the camera 210, especially on the periphery of the 180° view, appear distorted. This distortion is typically circular for a circular fisheye imaging system, but can be of other shapes, depending on the lens system installed.

Systems and methods for transforming a wide-angle image from one perspective form to another have been implemented using different techniques, and generally may be divided into three separate categories:

a) tabular distortion-correction systems and methods;
   b) three-dimensional (3D) projection systems and methods; and
   c) two-dimensional (2D) transform mapping systems and methods.

The first category includes U.S. patent application Ser. No. 10/837,012, entitled "Correction of Optical Distortion by Image Processing," which is hereby incorporated by reference. The distortion is corrected by reference to a stored table that indicates the mapping between pixels of the distorted image and pixels on the corrected image. The table is typically one of two types: 1) a forward table in which the mapping from distorted image to corrected image is held, or 2) a reverse table holding the mapping from corrected image to distorted image. On the other hand, U.S. patent application Ser. No. 10/186,915, entitled "Real-Time Wide-Angle Image Correction System and Method for Computer Image Viewing," which is hereby incorporated by reference, generates warp tables from pixel coordinates of a wide-angle image and applies the warp table to create a corrected image. The corrections are performed using a parametric class of warping functions that include Spatially Varying Uniform (SVU) functions.

The second category of systems and methods use 3D computer graphics techniques to alleviate the distortion. For example, U.S. Pat. No. 6,243,099, entitled "Method for Interactive Viewing Full-Surround Image Data and Apparatus Therefor," which is hereby incorporated by reference, discloses a method of projecting a full-surround image onto a surface. The full-surround image data is texture-mapped onto a computer graphics representation of a surface to model the visible world. A portion of this visible world is projected onto a plane to achieve one of a variety of perspectives. Stereographic projection is implemented by using a spherical surface and one-to-one projecting each point on the sphere to points on an infinite plane by rays from a point antipodal to the sphere and the plane's intersection.

The third category includes US Pat. No. Re 36,207, entitled "Omniview Motionless Camera Orientation System," which is hereby incorporated by reference, discloses a system and method of perspective correcting views from a hemispherical image using 2D transform mapping. The correction is achieved by an image-processor implementing an orthogonal set of transform algorithms. The transformation is predictable and based on lens characteristics.

In order to interpret the motion of a moving object, it is enough to correct the indices of moving blobs in the video for motion based unusual event detection. Because the unusual event detection method is based on the trajectories of moving objects in the viewing range of the camera, one can simply correct the trajectory of a moving object before making a decision according to a look up table or a function. Consider the example of a person walking with a constant speed along a straight line, which does not produce uniformly spaced center of mass locations in a wide angle video, i.e., $|x_{i+1}-x_i|$ will not be the same for all i values even for someone walking just below the camera because of the circular nature of the fisheye image. Although the trajectory will be a straight line going through the center of the circular image, distance between the two consecutive moving blob center of masses $|x_{i+1}-x_i|$ will be smaller when the person is away from the camera 210 compared to those distance values beneath the camera.

Rabiner and Juang describe three problems that need to be addressed in Hidden Markov Models:

1. Compute probability of the event given a set of feature parameters describing the event.
2. State estimation for 1 because states are "hidden."
3. Training for 2 and state transition probabilities.

The unusual event detection therefore depends on a state estimation probability that an object vector corresponds to unusual as opposed to normal behavior or movement.

Figure 3:
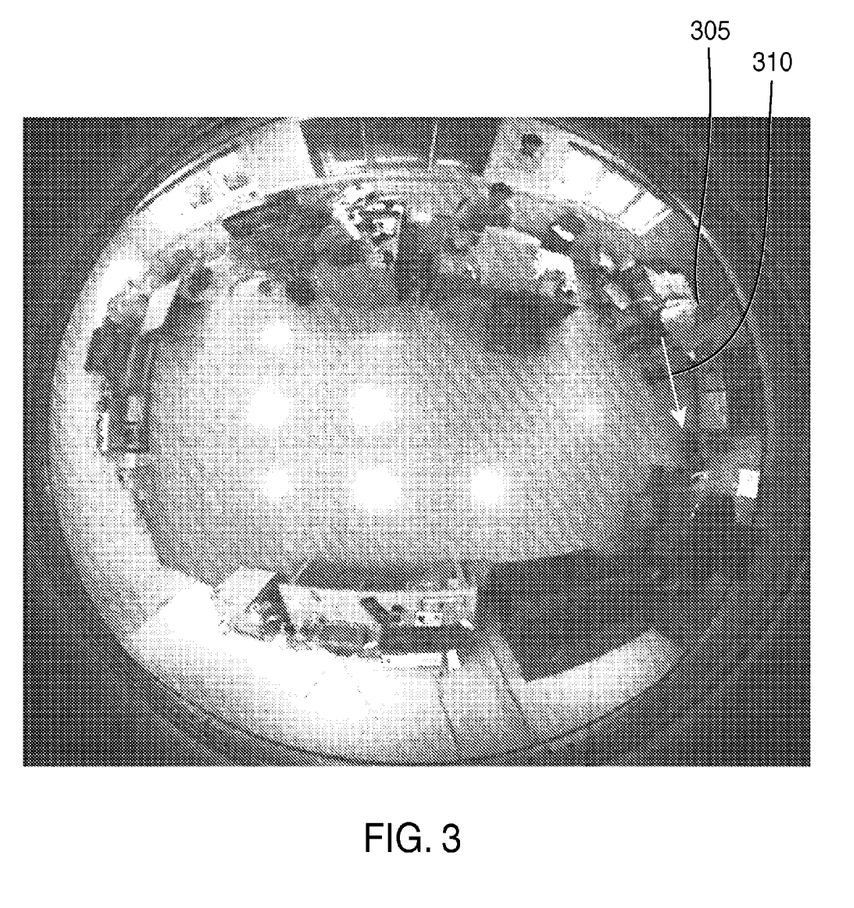
FIG. 3 is a fisheye image frame of a wide-angle video.
Figure 4:
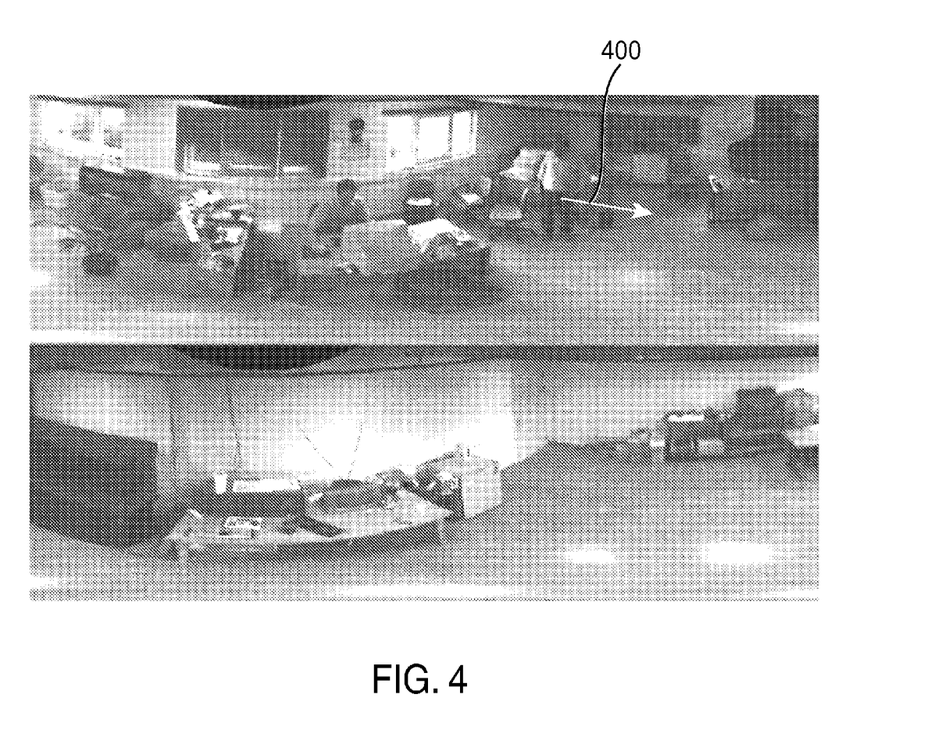
FIG. 4 is the distorted image view of FIG. 3 corrected as a panoramic image of the room.

In FIG. 3, a fisheye image frame of the wide-angle video is shown. A moving object 305 (i.e., a standing person in the room) moves towards the right of the room. A motion vector 310 is also shown in the image (although the person moves to the right of the room the motion vector points downwards in the fisheye image). This fisheye distorted image view is corrected in FIG. 4 as a panoramic image of the room. The corrected motion vector 410 is also shown in FIG. 4, and the motion vector now points towards the right.

Trajectory correction can be made by using a look up table describing a function $$y=g(x)$$

where x represents coordinates (or indices of pixels) in the fisheye image and y represents the coordinates in the corrected domain (e.g., Cartesian coordinates). For example, the standing person appearing horizontal in the fisheye image (FIG. 3) is corrected in FIG. 4 under the transformation function g. The function g changes according to the nature of the lens but it is not difficult to generate a look up table summarizing it for a given wide angle lens. A corrected version of the image shown in FIG. 3 is shown in FIG. 4. Thus, we track movement in a non-rectilinear image.

Unusual Event Detection Using Corrected Moving Object Trajectories

In this section, we describe how we process the corrected locations of moving objects for unusual event detection. We define the state according to the angle of the vector in the image plane, and we will define several scenarios for unusual events based on moving object trajectories.

Scenario 1:

$y_1, y_2, y_3 \ldots, y_{N+1}$ are the corrected locations of a moving object at each image frame of a wide angle video. Obtaining a set of difference vectors $v_1=y_2-y_1, v_2=y_3-y_2, \ldots, V_N=y_{N+1}-y_N$ The vectors $v_1, v_2, \ldots, v_N$ are motion vectors, and most of the motion vectors are almost equal to each other for a regular moving object or a person moving in a room. A regular person knows where to go, e.g., he enters the room and goes to his desk. In contrast, in an unusual event the vectors will not be equal to each other. Because there will be sudden turns, irregular movement, searching for something in the room, moving up and down, and visiting/searching multiple desks in a room, etc. Accordingly, the angle of the vector varies irregularly. Additionally, the magnitude of the vector (e.g., running, rapid head movement, etc) can be used for some screening to indicate an unusual event.

The operator may also define unusual events. For example, if someone exits from a door in the wrong direction or an area in the viewing range of the camera may be a prohibited zone etc. These will be the subject of Scenario 2.

Smoothing the difference vectors using a low-pass filter with coefficients (1/4, 1/2, 1/4) and obtaining another set of vectors:

$$W=w[1],w[2],\ldots w[N]$$

After this step, calculating the magnitude and phase angles with respect to a reference line of each vector to convert the Cartesian motion vectors into polar coordinates, i.e., $$w[n] = w_n \exp(\theta_n)$$

where $w_n$ is the magnitude of the w[n] vector and the $\theta_n$ is the phase angle with respect to a reference line.

Figure 5A:
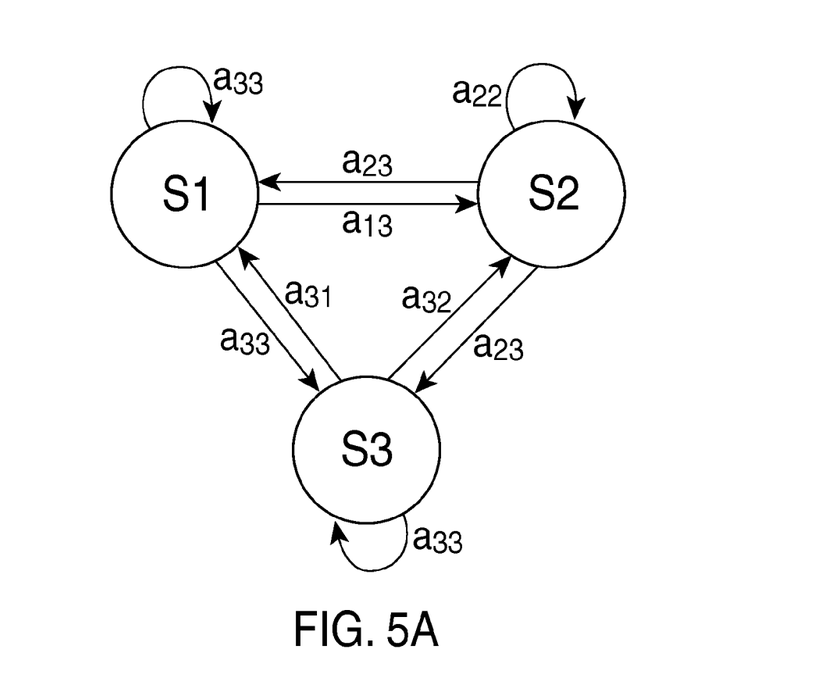
FIGS. 5A and 5B are exemplary MM structures shown for a regular motion and one for unusual event motion.
Figure 5B:
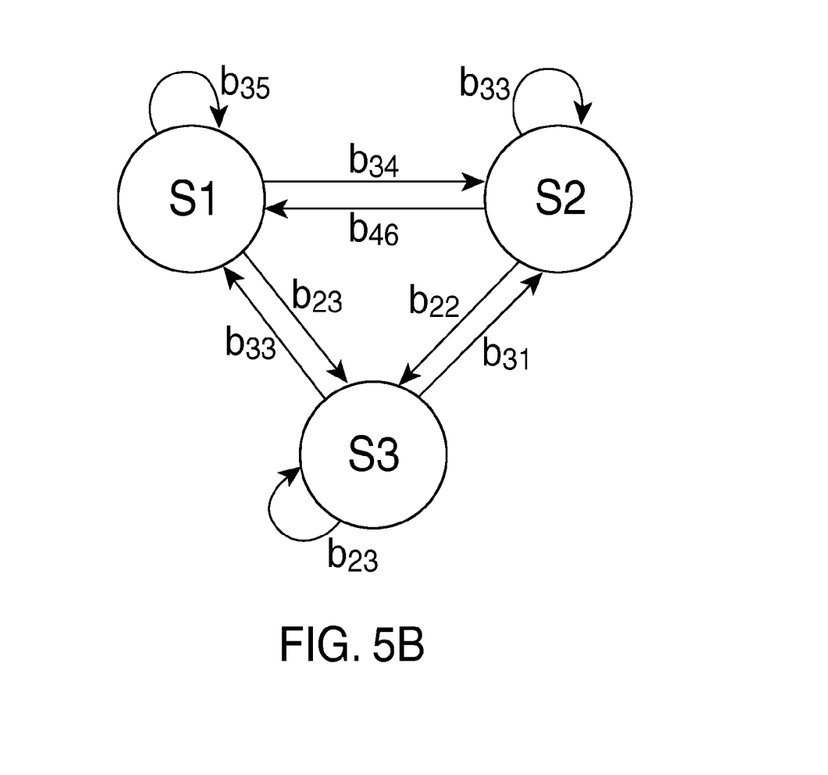

Markov Models (MM) Based on Motion Angles:

Consider the Markov Model (MM), a type of stochastic model, structure shown in FIGS. 5A and 5B. Each state is defined according to the angle of the motion vector. State 1 corresponds to 0 to theta (0) degrees with respect to a reference line, State 2 covers theta to 2θ, etc and State 3 corresponds to 2pi-theta (2110) to 2π. In each state, the observation variable is the magnitude of the motion vector. The magnitude of the motion vector can be characterized by a mixture of Gaussian probability density functions (pdf). One can even use a single Gaussian with mean, m, and standard deviation sigma to simplify computations. Since the states of Hidden Markov Models are not defined by the designer or the user in HMMs, they have to be determined using a computationally complex state estimation algorithm. In this implementation, states of MMs are manually defined according to the motion vector angles of the moving objects, simplifying the computations involved. The state estimation problem is straightforward in MMs. They are simply determined according to the angles of motion vectors.

Two non-hidden Markov Models with three states S1, S2, and S3 each covering $\theta$=120 degrees are shown in FIGS. 5A and 5B. The transition probabilities are defined as follows: $a_{ij}$=Prob(State j at t=n+1 | State i at t=n).

Markov Model A is for regular events and Markov Model B is for unusual events, corresponding to FIGS. 5A and 5B respectively. Each Markov model has the same structure but the transition probabilities differ for the model describing the regular events and unusual events, respectively. In regular motion, phase angles of w[n] remain the same and do not change very often compared to unusual events in which the subject may change direction suddenly or even zig-zag in a room. Therefore, probabilities $a_{ii}$ will be larger than $a_{ij}$, i≠j. Also, the magnitudes of the motion vectors do not typically change during regular motion, which may corresponds to a person walking with a steady pace. On the other hand, the magnitude is expected to change in an unusual event, and as noted above, may be higher in an unusual event scenario (e.g., running, rapid head movement, rapid arm movement, etc).

The recognition problem is to find the model producing a given $w[n]=w_n \exp(\theta_n)$ sequence with highest probability. The first step of the MM based analysis (in both the recognition and the training phases) consists of estimating a state transition sequence from the moving object data. This is done according to the motion vector angles. An example state transition sequence may look like:

$$C = (S1, S1, S2, S2, S1, \ldots, S3, S1)$$

At each state Si, we observe a motion vector magnitude $w_1$. The probability of obtaining the transition sequence C and the motion vector magnitudes $w_1$ in Model A is equal to $$\text{Prob}(W|A) = p_{S1} * a_{11} * p_1 * a_{12} * p_2 * a_{22} * p_3 * a_{21} * p_4 * \ldots * a_{31}$$

where $p_{S1}$ is the probability of starting with state S1 and the observation probability pi=Prob($w_1$) is the probability of observing the motion vector magnitude $w_1$ in state S1, p2=Prob($w_2$), etc. which are estimated using typical regular motion events recorded a priori. This process is called the training phase of MM. Clearly, the probability of obtaining the transition sequence C and the corresponding motion vector magnitudes for Model B is equal to $$\text{Prob}(W|B) = P_{s1} * b_{11} * p_1 * b_{12} * p_2 * b_{22} * p_3 * b_{21} * p_4 * \ldots * b_{31}$$

During the recognition phase, both of the above conditional probabilities are computed for a given sequence C, and the model producing the highest probability is selected. Model probabilities are estimated from typical unusual event videos recorded a priori. Fast recursive algorithms for computing Prob(W|A) and Prob(W|B) using logarithmic look-up tables are described in the book by Rabiner and Juang.

More transitions should occur between states when monitoring an unusual event compared to regular human motion or regular motion of moving objects. Hence, the probabilities of transitions between different states, $a_{ij}$'s, i≠j are higher than in-state transition probabilities, $a_{ii}$'s, for the regular motion model. On the other hand, the transition probabilities $b_{ij}$, i≠j values will be relatively higher in an unusual event. Therefore, in an unusual event $$\text{Prob}(W|B) > \text{Prob}(W|A)$$

There can be more than one Markov Model (MM) describing regular events. In the case of an unusual event, Prob(W|B) is higher than the conditional probabilities of all MMs representing regular events. When there is more than one MMs for unusual events, it is sufficient to have the conditional probability of one of these to be higher than the conditional probability of regular MMs to detect an unusual event. Examples of possible MM for unusual events include one for hiding, one for rifling, one for accident, one for falling, one for forbidden areas, etc.

Scenario 2:

In a hallway or corridor, people may be expected to walk only in one direction. If someone stands still, loiters, or walks in the opposite direction, then the wide-angle camera equipped with a MM based motion analysis software produces an alarm. Trajectories of moving objects can be modeled as a classification problem.

Class 1: People moving in the correct direction. A Markov Model (MM) is designed to represent the motion of people moving in the correct direction.

Class 2: People moving in the opposite direction or standing still or zig-zaging in the hallway. Two Markov Models are designed for this class. One MM is allocated to people zig-zaging or meandering people in the room or hallway. The second MM represents people who move too slow. A third MM is designed for people standing still in the room. In this case, the person moves a little bit in the room and stops somewhere in the middle. This set of MMs can also be used for detecting suddenly stumbling and falling people in a room or a hallway or someone exiting from a forbidden exit.

In the next section we describe the design (or training) problem of MMs.

Training of MMs:

The training process of MMs consists of estimation of transition probabilities and observation probabilities of each Markov Model. This is achieved with the help of recorded videos containing both regular and unusual events. Motion vector sequences w[n] are estimated from each video. Transition probabilities and observation probabilities of MMs representing usual events are estimated from the motion vector sequences of regular events. Similarly, transition probabilities and observation probabilities are estimated from the motion vectors of unusual event videos. The probability estimation procedure is discussed in the book by L. Rabiner and B-H. Juang.

Scenario 3:

Location normally is not used for normal behavior, but it can be used for unusual event detection. Assume that the operator marks a region in the viewing range of the wide angle camera as a forbidden zone. It is more natural to select the forbidden zone in the corrected image domain. Some wide angle cameras have the built-in feature of providing corrected images to the users as described by the U.S. Pat. No. 7,366,359 issued to Grandeye Ltd. and incorporated by reference. In such systems the marked region in the corrected image domain is mapped to the fisheye image, and it may be sufficient to check the coordinates of center of mass, $x_1$, $x_2$, $x_3$, ..., $x_{N+1}$, of moving objects to produce an alarm. Whenever one of the center of mass coordinates is in the forbidden region an alarm is generated.

The operator may wish to allow people to stay in a forbidden zone for a short pre-specified duration similar to the 3 second zone in basketball. In this case, one needs to monitor the duration of center of mass locations. An alarm is issued whenever a subset of center of mass locations $x_i$, $x_{i+1}$, $x_{i+2}$, ..., $x_{1+L}$, stays inside the forbidden zone.

It should be clear to those skilled in the art that the techniques disclosed above might be applied to more than one region within a camera. The foregoing has described methods for the implementation of image processing within regions that are given for illustration and not for limitation. Thus the invention is to be limited only by the appended claims.

According to a disclosed class of innovative embodiments, there is provided: A method of monitoring moving objects in a wide-angle video, comprising the steps of: determining moving object trajectories; converting the moving object trajectories to a trajectory in a perspectively corrected image domain; and interpreting the object trajectories for detecting unusual behavior using state transition probability models of non-hidden Markov models.

According to a disclosed class of innovative embodiments, there is provided: A method of monitoring moving objects in a wide-angle video, comprising the steps of: determining moving object trajectories; and interpreting the object trajectories for detecting unusual behavior for an unusual event in a distorted image domain using a state transition analysis of Markov Models.

According to a disclosed class of innovative embodiments, there is provided: A method for designating a pixel group movement as an unusual event, comprising the steps of: determining movement trajectories of a group of pixels corresponding to a moving object; and associating the moving object trajectories with unusual behavior designated as an unusual event in a non-rectilinear image domain using Markov models.

According to a disclosed class of innovative embodiments, there is provided: A method for classifying movement as an unusual event, comprising the steps of: calculating movement trajectories for a blob of pixels on a image data set; training a plurality of state transition probability models with prior trajectory data corresponding to regular and unusual motion trajectories of moving objects; and analyzing the movement trajectories for the blob and assigning an unusual event classification according to the outcome of probability calculations on the state transition probability models.

According to a disclosed class of innovative embodiments, there is provided: A system for monitoring moving objects in a wide-angle video, comprising: a wide-angle lens on a digital video camera capturing a sequence of video images; and an image data processor detecting and converting moving object trajectories into vectors in a perspectively corrected image domain and interpreting the object vectors as unusual behavior according to a stochastic model, which is not a hidden Markov Model, in which the states are defined according to motion vector angles of moving objects.

According to a disclosed class of innovative embodiments, there is provided: A system for monitoring moving objects in a wide-angle video, comprising: a wide-angle lens on a digital video camera capturing a sequence of video images; and an image data processor detecting and converting moving object trajectories into vectors in a perspectively corrected image domain and interpreting the object vectors as unusual behavior according to a stochastic model, which is not a hidden Markov Model, in which the states are defined according to motion vector angles of moving objects.

According to a disclosed class of innovative embodiments, there is provided: A system for detecting unusual events in a wide-angle video, comprising: an electronic camera that emulates PTZ function capturing wide-angle digital video images; and an image data processor that calculates and converts moving pixel blob trajectories in a non-rectilinear image domain and analyzes the blob trajectories as unusual behavior using state transition probability models applied to a data object histogram; wherein the state transition probability models are trained using prior trajectory data corresponding to regular and unusual motion trajectories of moving objects.

According to a disclosed class of innovative embodiments, there is provided: A system for classifying a movement as an unusual event in a wide-angle video, comprising: a digital PTZ camera capturing distorted images and converting the images into a video stream of non-rectilinear video images; image data processing circuitry operating analysis software algorithms that segment moving object pixels from stationary pixels, determine corrected motion vectors for the moving object, analyze the vectors according to Markov models, and classify the movement as normal or unusual; wherein the movement is classified according to the conditional probability if ones of unusual event Markov models exceed the conditional probability of ones of regular event Markov models.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given.

The references herein to video and still images is not limited to analog or video alone, and can be either variety or any other format or type of imaging technology.

The innovations of the present application are preferably implemented using a wide-angle camera, though any type of wide view camera can be used in implementing the present invention, including other anamorphic and non-anamorphic imaging systems. Additionally, although a video camera is described a camera capturing still images at a periodic time interval can be used.

The various innovations can be implemented via one or more internal camera image processors or on a separately connected base station, or a combination of the two.

The innovations can also be implemented using multiple cameras in various configurations. Two cameras can be positioned with overlapping fields-of-view with both operating to detect unusual movement or just one, with results from one shared with the other. Thus, one camera can be used to trigger ROI selection in a different camera.

There may be a size component to consider as well. For example, an exemplary system may not be desirable that identifies ruffling leaves as an unusual event. Or, an oversize truck on a given road with otherwise normal movement vectors may need to identified as an unusual event.

Similarly, the innovations can be linked with object recognition algorithms to perform selective analysis. For example, the system can be configured to analyze humans only, trucks only, everyone but identified employees, etc. The combination can also detect abnormal trajectories with recognition of objects, e.g., human lying on the floor, cars colliding, etc.

Although a PTZ electronic camera is described, the camera system can also include a rotation movement, i.e. a PTZR electronic camera.

Generally, at least two MM will be used, but a single MM can be used with threshold vector and/or magnitude values indicating an unusual event.

As has been mentioned above, the examples given herein are only illustrative and are not intended to imply that these are the only ways to implement the present innovations. The order of the actions described herein, and the locations at which they are performed, can of course vary within the scope of the present innovations. These innovations are also applicable for other types of processing aside from those mentioned, beyond object tracking, privacy domains, and alarm triggering. Outside computer systems, such as servers, can be used for calculating many of the necessary functions, or the camera itself can be equipped with this capability.

Additional general background, which helps to show variations and implementations, may be found in the following publications, all of which are hereby incorporated by reference:

The edited book by Sergio A. Velastin and Paolo Remagnino entitled "Intelligent distributed video surveillance systems", published by Institution of Electrical Engineers in 2006 fails to provide any unusual event detection methods (based on moving object trajectories) for wide-angle cameras.

United States Patent Application 20060187305 by Trivedi et al., Aug. 24, 2006 entitled "Digital processing of video images" describes an HMM based video analysis method for warped video images but it fails to use moving object trajectories in Markov models for unusual event recognition. A method based on HMMs is computationally more inefficient than the present approach using Markov Models with well-defined states, which are defined according to the motion vector angles of the moving objects.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed is:

1. A method for designating a pixel group movement as an unusual event in a wide angle video, comprising the steps of:
   determining movement trajectories of a group of pixels corresponding to a moving object in the wide angle video; and
   associating the moving object trajectories with unusual behavior designated as an unusual event in a non-rectilinear image domain using non-hidden Markov models; and
   designating a moving object trajectory as unusual behavior when the conditional probability of at least one non-hidden Markov model defined as unusual behavior exceeds the conditional probability of a non-hidden Markov model defined as usual behavior.

2. The method of claim 1, further comprising the step of:
   segmenting foreground moving objects from stationary background objects using a recursive estimation using past image frames of the background image in the non-rectilinear image domain.

3. The method of claim 1, further comprising the step of:
   segmenting foreground moving objects from stationary background objects by median filtering in the non-rectilinear image domain.

4. The method of claim 1, further comprising the step of:
   determining the trajectory of moving objects based on the histogram of the wavelet coefficients of the moving objects.

5. The method of claim 1, further comprising:
   tracking detected moving objects in the non-rectilinear image domain using a mean-shift object tracking method operating in the non-rectilinear image domain.

6. The method of claim 1, further comprising:
   training the Markov models with motion vectors in Cartesian coordinates and polar coordinates computed the non-rectilinear image domain.

7. The method of claim 1, further comprising:
   training at least one Markov model with motion vectors in Cartesian coordinates and polar coordinates computed the non-rectilinear image domain defined as usual behavior.

8. The method of claim 1, further comprising:
   training at least one Markov model with motion vectors in Cartesian coordinates and polar coordinates computed the non-rectilinear image domain defined as unusual behavior.

9. A method for classifying movement as an unusual event in a wide angle video, comprising the steps of:
   calculating movement trajectories for a blob of pixels on an image data set;
   training a plurality of state transition probability models with prior trajectory data corresponding to regular and unusual motion trajectories of moving objects;
   analyzing the movement trajectories for the blob in a non-rectilinear image domain; and
   assigning an unusual event classification according to the outcome of probability calculations on the state transition probability models,
   wherein a trajectory is classified as an unusual even according to a non-hidden Markov model for unusual motion exceeding a probability associated with a non-hidden Markov model for regular motion.

10. The method of claim 9, wherein the state transition probability models are non-hidden Markov models.

11. The method of claim 9, wherein training the state transition probability models uses motion vectors in Cartesian coordinates and polar coordinates computed from image data associated with unusual motion.

12. The method of claim 9, wherein training the state transition probability models uses motion vectors in Cartesian coordinates and polar coordinates computed from image data associated with regular motion.

* * * * *